US008630244B2

(12) United States Patent
Atarashi et al.

(10) Patent No.: US 8,630,244 B2
(45) Date of Patent: *Jan. 14, 2014

(54) CHANNEL STRUCTURING METHOD AND BASE STATION THEREWITH

(75) Inventors: Hiroyuki Atarashi, Yokohama (JP); Sadayuki Abeta, Yokosuka (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 573 days.

This patent is subject to a terminal disclaimer.

(21) Appl. No.: 12/629,571

(22) Filed: Dec. 2, 2009

(65) Prior Publication Data

US 2010/0080207 A1  Apr. 1, 2010

Related U.S. Application Data

(63) Continuation of application No. 09/926,193, filed as application No. PCT/JP01/00419 on Jan. 23, 2001, now Pat. No. 7,646,747.

(30) Foreign Application Priority Data

Jan. 24, 2000  (JP) .................................. 2000-014931

(51) Int. Cl.
 *H04W 4/00* (2009.01)
 *H04B 7/212* (2006.01)

(52) U.S. Cl.
 USPC .......................................... 370/329; 370/322

(58) Field of Classification Search
 USPC ......... 370/203, 208, 326, 347, 431, 436, 437; 375/260
 See application file for complete search history.

(56) References Cited

U.S. PATENT DOCUMENTS

| | | | |
|---|---|---|---|
| 5,652,752 A | 7/1997 | Suzuki et al. | |
| 5,724,378 A | 3/1998 | Miki et al. | |
| 5,867,478 A | 2/1999 | Baum et al. | |
| 5,909,436 A | 6/1999 | Engstrom et al. | |
| 5,914,981 A | 6/1999 | Veintimilla | |
| 6,430,166 B1 | 8/2002 | Bejjani et al. | |
| 6,473,467 B1 | 10/2002 | Wallace et al. | |
| 6,496,551 B1 | 12/2002 | Dam et al. | |
| 6,526,091 B1 * | 2/2003 | Nystrom et al. | 375/142 |

(Continued)

FOREIGN PATENT DOCUMENTS

| | | |
|---|---|---|
| CN | 1221307 A | 6/1999 |
| EP | 0 905 923 A2 | 3/1999 |

(Continued)

OTHER PUBLICATIONS

S. Abeta et al., The Institute of Electronics, Information and Communication Engineers, vol. 99, No. 357, pp. 63-70, "Performance Comparisons of Coherent SC/DS-CDMA, MC/DS-CDMA, MC-CDMA on Down-Link Broadband Radio Packet Transmission," Oct. 1999 (with English Abstract).

*Primary Examiner* — Warner Wong
(74) *Attorney, Agent, or Firm* — Oblon, Spivak, McClelland, Maier & Neustadt, L.L.P.

(57) ABSTRACT

The present invention is directed to a channel structuring method that includes a step of providing time frames segmented at a predetermined interval in communication channels of n subcarriers, a step of selecting a predetermined number of subcarriers from n subcarriers and a step of inserting a common control channel signal and a common pilot signal periodically into each of the time frames of the selected subcarriers.

3 Claims, 14 Drawing Sheets

(56) References Cited

U.S. PATENT DOCUMENTS

| | | |
|---|---|---|
| 6,532,223 B1 | 3/2003 | Sakoda et al. |
| 6,647,000 B1 | 11/2003 | Persson et al. |
| 6,907,014 B1 | 6/2005 | Kitade |
| 6,912,405 B2 | 6/2005 | Hiramatsu et al. |
| 7,324,495 B1 | 1/2008 | Gibbons et al. |
| 2001/0012283 A1 | 8/2001 | Miya et al. |
| 2002/0080887 A1 | 6/2002 | Jeong et al. |
| 2004/0095904 A1 | 5/2004 | Laroia et al. |
| 2005/0220002 A1 | 10/2005 | Li et al. |
| 2006/0285484 A1 | 12/2006 | Papasakellariou et al. |

FOREIGN PATENT DOCUMENTS

| | | |
|---|---|---|
| EP | 0 977 393 | 2/2000 |
| JP | 8-88617 | 4/1996 |
| JP | 11-261544 | 9/1999 |
| JP | 2000-13353 | 1/2000 |
| JP | 2000-201134 | 7/2000 |
| WO | WO 98/35473 | 8/1998 |
| WO | WO 98/47253 | 10/1998 |
| WO | WO 98/59450 | 12/1998 |
| WO | WO 99/01956 | 1/1999 |

\* cited by examiner

THE COMMON CONTROL CHANNEL SIGNAL AND
THE COMMON PILOT SIGNAL ARE FREQUENCY-
MULTIPLEXED WITH THE INFORMATION SIGNAL
TO BE INSERTED TO SELECTED SUBCARRIERS

CHANNEL STRUCTURING METHOD AND BASE STATION THEREWITH

CROSS REFERENCE

This application is a continuation application of U.S. Ser. No. 09/926,193, filed Sep. 21, 2001, the entire contents of which are incorporated herein by reference. U.S. Ser. No. 09/926,193 is a National Stage application of PCT/JP01/00419, filed Jan. 23, 2001, which claims priority under 35 U.S.C. 119 to Japanese Application No. 2000-014931, filed Jan. 24, 2000.

TECHNICAL FIELD

The present invention relates to a channel structuring method and a base station using such a method. The present invention particularly relates to a channel structuring method for a downlink channel between a base station and mobile stations, and relates to the base station using such a method.

BACKGROUND TECHNOLOGY

Generally, a mobile communication system is operated under a multipath environment where radio wave reaches a reception side through various propagation paths. Under such a multipath environment, a signal that arrives later interferes with a signal of the present, producing characteristic degradation which is called inter-symbol interference.

However, a transmission method that employs an orthogonal frequency division multiplexing (called the OFDM hereinafter, Orthogonal Frequency Division Multiplexing) as a modulation method can realize a high-speed transmission, without causing characteristic degradation by the inter-symbol interference, even if it is under a multipath environment.

This is because the influence of the inter-symbol interference is alleviated by long symbols used by the OFDM transmission in which a wideband signal is segmented and transmitted in parallel using a plurality of subcarriers that are orthogonal to each other. Against this background, studies have been made on mobile communication systems that use the OFDM as the modulation method.

As an example of a mobile communication system that uses the OFDM as the modulation method, "Performance of an OFDM-TDMA Mobile Communication System" (1593 H. Rohling, R. Grunheid: Proc. of IEEE VTC 1996, and vol. 3, pp. 1589-1996), for example, uses the OFDM as the modulation method for the signal transmission and examines the time division multiple access (TDMA herein below, Time Division Multiple Access:) for communication between a base station and each mobile station.

In this study, it is shown that communication quality will be enhanced by adaptively assigning signals transmitted to mobile stations to subcarriers according to subcarrier reception conditions at the mobile station, utilizing the characteristics of the OFDM that conducts a transmission with a plurality of subcarriers.

Further, a similar study has been made in "Performance Comparison of Different Multiple Access Methods Schemes for the Downlink of an OFDM Communication System" (Proc. of IEEE VTC 1997 pp. 1365-1369, 1997).

In this study, an example of a frame structuring that takes synchronization signal, control signal, and information signal into consideration is shown for application to an OFDM transmission between the base station and the mobile station.

Further, the mobile communication system experiences a phenomenon called fading that is caused by changes in the relative position of the base station and the mobile station, which affects received signals with amplitude fluctuation and phase fluctuation. Therefore, in order to receive a signal transmitted in the mobile communication system by a coherent detection, it is necessary to estimate the amplitude fluctuation and the phase fluctuation accurately to compensate the fluctuations of the received signal using the estimated values for demodulation.

In order to estimate the amplitude fluctuation and the phase fluctuation of the received signal, there is a method wherein a pilot symbol with known amplitude and phase is multiplexed with a transmission signal and transmitted, which is used to estimate the amplitude fluctuation and the phase fluctuation of the received signal on the receiving end. In the mobile communication system which uses the OFDM as the modulation method, the channel estimation using the pilot symbol is also necessary in order to perform the coherent detection, and various studies have been made.

In "Robust Channel Estimation for OFDM System with Rapid Dispesive Fading Channels" (Y. Li, L. J. Cimini, N. R. Sollenberger. IEEE Transactions on Communications, vol. 46, no. 7, July 1998), for example, a method using a combination of the channel estimation in the time domain and the channel estimation in the frequency domain is shown.

Further, in "Performance Analysis of an OFDM System Using Data-Aided Channel Estimation" (V. Kaasila: Proc. of IEEE VTC 1999, pp. 2303-2307), a study is made as to a time interval at which the pilot symbol should be multiplexed and how much pilot symbol should be used to estimate the channel fluctuation.

However, the various studies mentioned above are concerned with a proposal and an evaluation of the methods for mainly enhancing transmission quality. In order for a mobile communication system to use an OFDM/TDM (Time Division Multiplex) transmission method for a downlink actually, it is necessary to consider a structuring method of the common control channel for transmitting a control signal between the base station and the mobile station.

Especially, it is necessary to consider use of the channel of not only in the time domain but also in the frequency domain, because the parallel transmission by two or more subcarriers is performed when the OFDM is used as the modulation method.

Furthermore, the studies concerning the pilot symbol insertion have been performed about how much amount of pilot symbol is required, and how the pilot symbols should be inserted only from the point of the measure to a physical fading phenomenon in an environment of one transmitter and one receiver.

DISCLOSURE OF INVENTION

Therefore, the general purpose of the present invention is to provide a new and useful channel structuring method having removed the problems of the conventional technology mentioned above, and a base station using the method.

The specific purpose of the present invention is to provide the channel structuring method which is capable of inserting the common control channel signal and the common pilot signal in the downlink channel between the base station and the mobile stations, and the base station using the method.

The purpose of the present invention mentioned above is achieved by a channel structuring method that includes a step of inserting the common control channel signal and the common pilot signal into n subcarriers in channel structuring methods that compose a downlink channel by modulating the transmission signal by an orthogonal frequency division multiplexing method which has n subcarriers, and multiplexing by a time division multiplex.

In the channel structuring method, the common control channel signal and the common pilot signal can be inserted into the downlink channel between the base station and the mobile station, thereby enabling to realize a channel structuring for transmitting the common control signal between the base station and the mobile station. Further, the insertion of the common pilot signal into the downlink channel makes a countermeasure to the fading phenomenon possible.

The above-mentioned channel structuring method can include a step wherein time frames that are segmented at a predetermined time interval in a communication channel of the n subcarriers mentioned above are provided, and a step wherein a predetermined number of subcarriers are selected from the n subcarriers mentioned above and the common control channel signal and the common pilot signal are inserted periodically into each of the time frames of the selected subcarriers.

In such a channel structuring method, a predetermined number of subcarriers are selected from the n subcarriers, and the common control channel signal and the common pilot signal are inserted into each time frame of the selected subcarriers. The common control channel signal and the common pilot signal can be inserted periodically.

In the above-mentioned channel structuring method, the common control channel signal and the common pilot signal which are periodically inserted into each time frame of a subcarrier selected as mentioned above can be inserted such that either of the common control channel signal or the common pilot signal, or both may be inserted at the same timing as either of the common control channel signal or the common pilot signal of other subcarriers, or both.

Thus, by inserting the common control channel signal and the common pilot signal into the selected subcarrier at the same timing as the common control signal and the common pilot signal inserted periodically into each frame of the other subcarriers, control in a base station and a mobile station becomes easy.

In the above-mentioned channel structuring method, a step of setting up time frames segmented at every predetermined interval in the communication channel of the n subcarriers mentioned above, a step of selecting a predetermined number of subcarriers from the n subcarriers mentioned above and continuously inserting the common control channel signal into the time frames of the selected subcarrier mentioned above, and a step of selecting a predetermined number of subcarriers from the n subcarriers mentioned above and periodically inserting the common pilot signal into each of the time frames of the selected subcarrier mentioned above may be provided.

In such a channel structuring method, the common control channel signal may be continuously inserted into the time frame of the selected subcarrier, and the common pilot signal can be periodically inserted for each time frame of the selected subcarrier.

In the above-mentioned channel structuring method, a step of setting up time frames segmented at every predetermined interval in the communication channel of the n subcarriers mentioned above, a step of selecting a predetermined number of subcarriers from the n subcarriers mentioned above and continuously inserting the common pilot signal into the time frames of the selected subcarriers mentioned above, and a step of selecting a predetermined number of subcarriers from the n subcarriers mentioned above and periodically inserting the common control channel signal into each of the time frames of the selected subcarriers mentioned above may be provided.

According to such a channel structuring method, the common pilot signal can be continuously inserted into the time frame of the selected subcarriers, and the common control channel signal can be periodically inserted for each time frame of the selected subcarrier.

In the channel structuring method mentioned above, subcarriers into which the above-mentioned common control channel signal is inserted may be the same completely or partially as subcarriers into which the common pilot signal is inserted.

According to such a channel structuring method, the common pilot signal can be inserted into the subcarrier into which the common control channel signal is continuously inserted, or the common control channel signal can be inserted into the subcarrier into which the common pilot signal is continuously inserted.

The above-mentioned channel structuring method may include a step of setting up the time frames segmented at each predetermined interval in a communication channel of the n subcarriers mentioned above, a step of selecting a predetermined number of subcarriers from the n subcarriers mentioned above and inserting the common control channel signal continuously into the time frames of the selected subcarriers mentioned above, and a step of selecting a predetermined number of subcarriers from the n subcarriers mentioned above and inserting the common pilot signal continuously into the time frames of the selected subcarriers mentioned above.

According to such a channel structuring method, each of the common control channel signal and the common pilot signal can be continuously inserted into the time frames of the selected subcarriers.

Further, the task of the present invention is achieved by a base station that includes common control channel signal insertion means for inserting the common control channel signal into all or part of the n subcarriers mentioned above and common pilot signal insertion means for inserting the common pilot signal into all or part of the n subcarriers mentioned above, among base stations that compose downlink channels by modulating transmission signals by the orthogonal frequency division multiplexing method using n subcarriers and by multiplexing by the time division multiplex.

Such a base station can insert the common control channel signal and the common pilot signal into the downlink channel. That is, the channel structuring for transmitting a common control signal between the base station and the mobile stations is realizable. Further, inserting the common pilot signal into the downlink channel makes the measure to a fading phenomenon possible.

BRIEF DESCRIPTION OF THE DRAWINGS

Other purposes, features, and advantages of the present invention will become clearer by reading following descriptions, with reference to attached drawings.

BEST MODE IMPLEMENTATIONS OF THE PRESENT INVENTION

Hereafter, implementations of the present invention are described based on the drawings.

Figure 1:
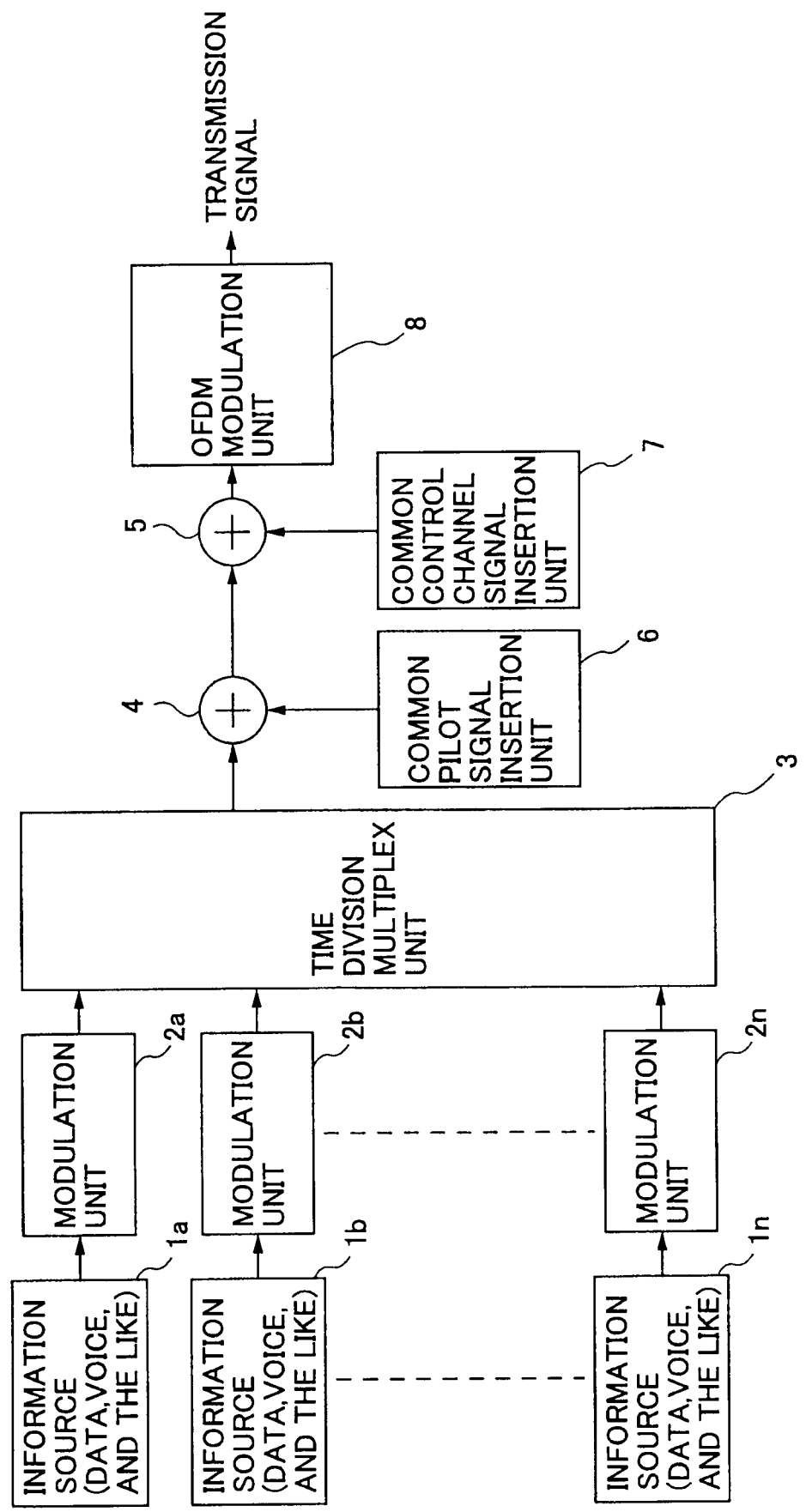
FIG. 1 is a block diagram of an example of equipment which realizes the channel structuring method in the present invention.

FIG. 1 is a block diagram of an example of equipment which realizes the channel structuring method in the present invention. In FIG. 1, information sources 1a through 1n output information signals to be transmitted to mobile stations from a base station, such as voice and data. The information signals outputted from the information sources 1a through 1n are supplied to a time division multiplexing (TDM) unit 3 after being modulated by modulation units 2a through 2n. The time division multiplex unit 3 carries out time division multiplexing of the modulated information signals. The common pilot signal provided from the common pilot signal insertion unit 6 is inserted into the time multiplexed signal at an adder 4, and the common control channel signal provided from a common control channel insertion unit 7 is inserted at an adder 5.

Here, the common control channel includes an information channel and an accompanying control channel which are generally used in mobile communication systems. The signal into which the common pilot signal and the common control channel signal have been inserted in the adder 4 and the adder 5 is supplied to an OFDM modulation unit 8.

The OFDM modulation unit 8 carries out an OFDM modulation of the supplied signal, and outputs the transmission signal which has a channel structuring that will be described later. In addition, the common pilot signal and the common control channel signal can be time-multiplexed by changing an assignment of subcarriers at every time interval and frequency-multiplexed by changing an assignment of the signal for each subcarrier.

Figure 2:
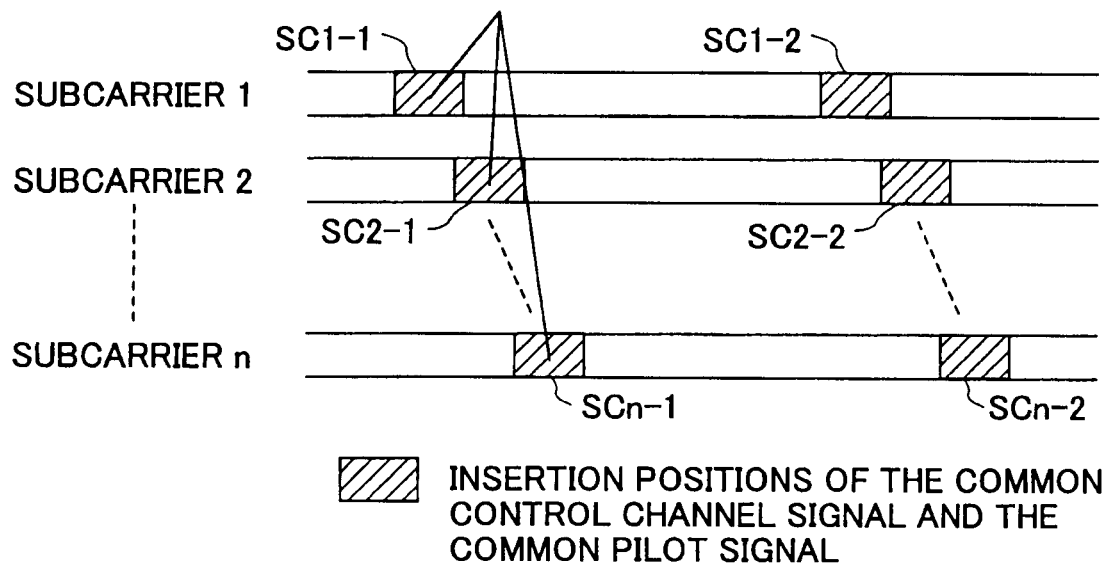
FIG. 2 is a channel structuring drawing of the first implementation of the channel structuring method in the present invention.

Hereafter, the channel structuring of the transmission signal will be described with reference to the drawings. FIG. 2 shows the channel structuring of the first implementation of the channel structuring method in the present invention. In the following, an OFDM method with subcarriers 1 through n (n: natural number) will be described.

In FIG. 2, the common control channel signal and the common pilot signal are inserted into the communication channel of each of the subcarriers 1 through n by time multiplexing. Specifically, the common control channel signal and the common pilot signal are inserted into insertion positions SC 1-1, SC1-2 and the like as shown in FIG. 2.

Additionally, into the insertion positions SC1-1 and the like, only the common control channel signal, only the common pilot signal or both of the common control channel signal and the common pilot signal may be inserted. Further, any method may be used for inserting the common control channel signal and the common pilot signal into the insertion position SC1-1 and the like of the communication channel of each of the subcarriers 1 through n by the time multiplexing.

Figure 3:
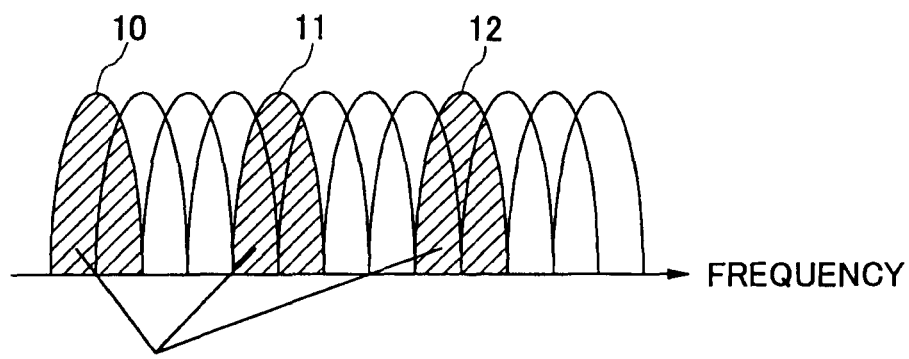
FIG. 3 is a channel structuring drawing of the second implementation of the channel structuring method in the present invention.

FIG. 3 shows the channel structuring of the second implementation of the channel structuring method in the present invention. In FIG. 3, subcarriers 10, 11, and 12 are selected into which the common control channel signal and the common pilot signal will be inserted, and the common control channel signal and the common pilot signal are frequency-multiplexed using the selected subcarriers 10, 11, and 12.

In addition, the selected subcarrier 10 and the like may include only the common control channel signal, only the common pilot signal, or the both of the common control channel signal and the common pilot signal. Further, any method may be used for inserting the common control channel signal and the common pilot signal into the selected subcarrier 10 and the like by the frequency multiplexing.

Figure 4:
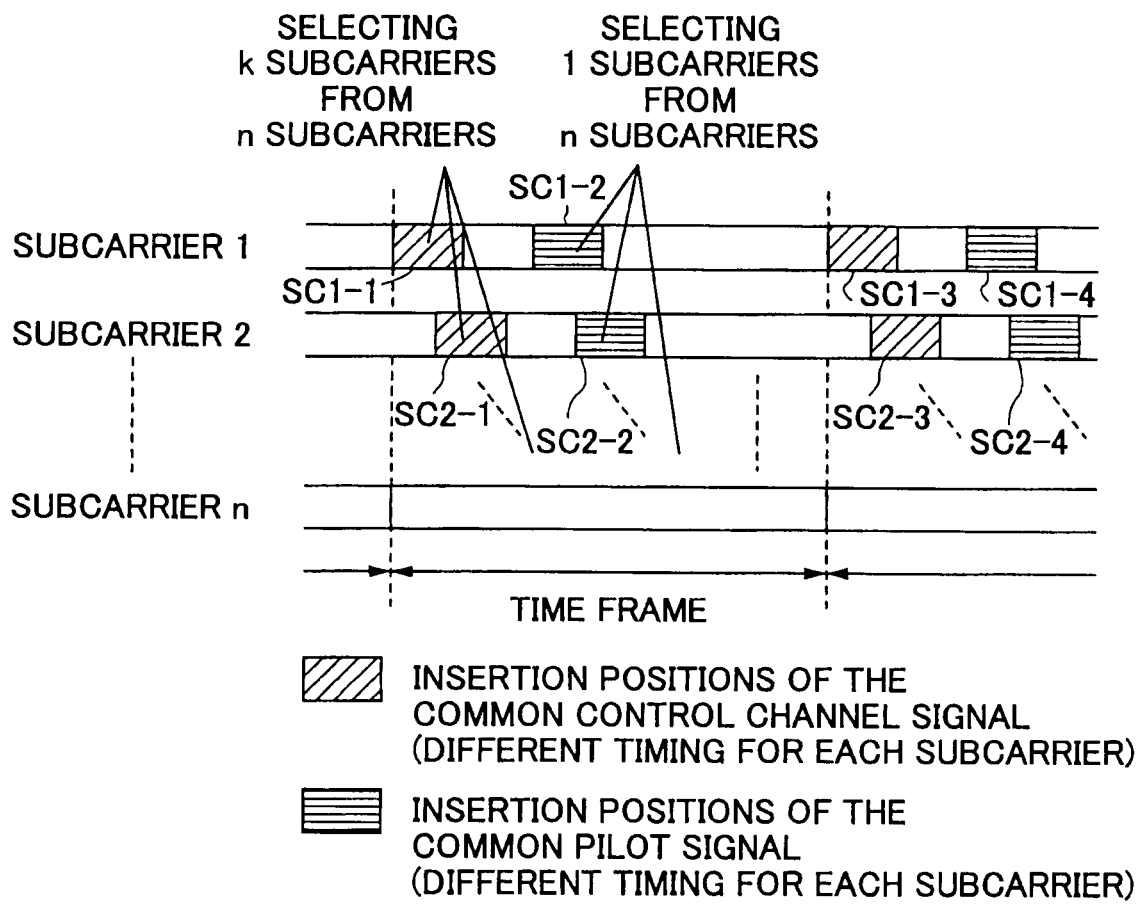
FIG. 4 is a channel structuring drawing of the third implementation of the channel structuring method in the present invention.

FIG. 4 shows the channel structuring of the third implementation of the channel structuring method in the present invention. In FIG. 4, the time frames segmented at every constant interval are provided in the communication channel of the n subcarriers 1 through n.

First, any k pieces (k: natural number, k<=n) of the subcarriers are selected from n subcarriers 1 through n, and the common control channel signal is periodically inserted into every time frame. Further, any l pieces (l: natural number, l<=n) of the subcarriers are selected out from n subcarriers 1 through n, and the common pilot signal is periodically inserted into every time frame.

For example, the common control channel signal is inserted into the insertion positions SC 1-1 and SC 1-3 of the subcarrier 1. Further, the common pilot signal is inserted into the insertion positions SC 1-2 and SC 1-4 of the subcarrier 1. Further, the insertion positions of the common control channel signal and the common pilot signal are different in timing for each subcarrier.

In addition, the relative insertion position and time length within a time frame for the common control channel signal and the common pilot signal can be any insertion position and time length.

Figure 5:
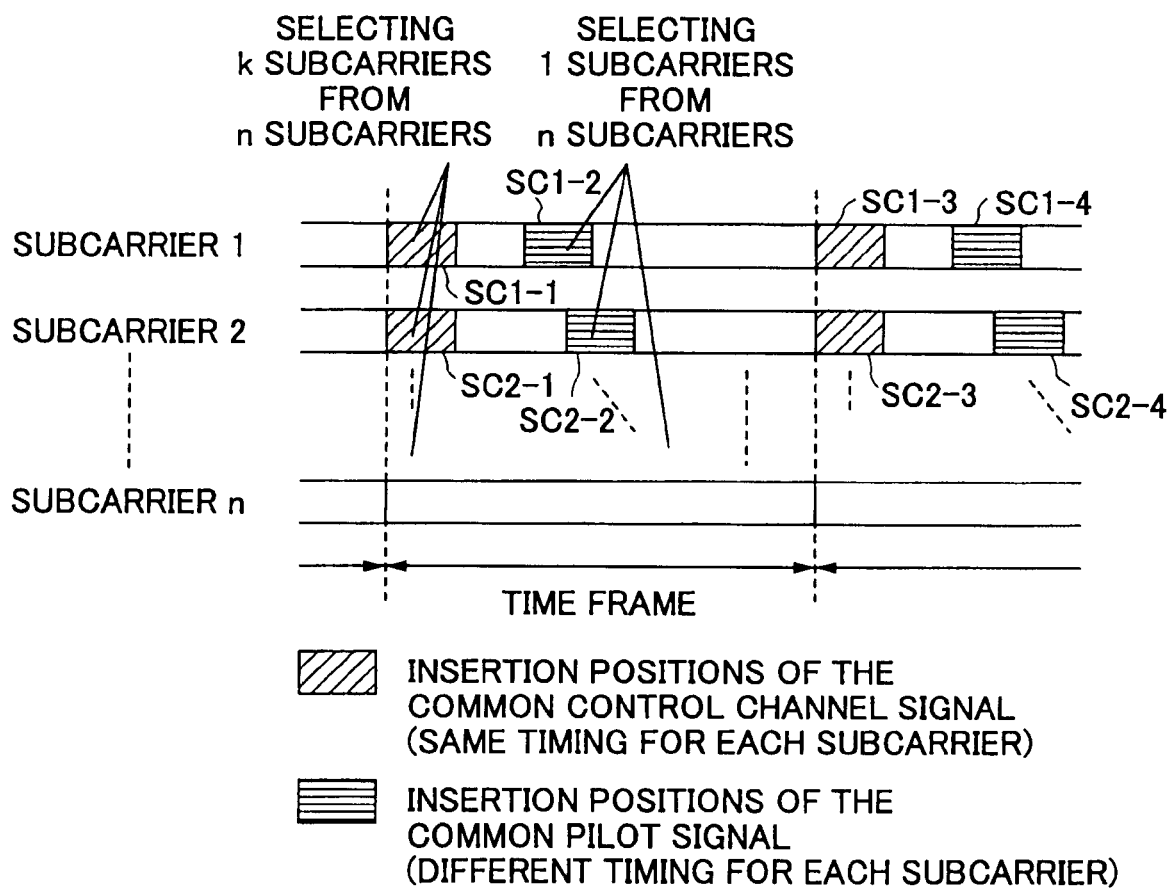
FIG. 5 is a channel structuring drawing of the fourth implementation of the channel structuring method in the present invention.

FIG. 5 shows the channel structuring of the fourth implementation of the channel structuring method in the present invention. In the channel structuring drawing of FIG. 5, providing time frames in the communication channel of the n subcarriers 1 through n, and selecting an arbitrary number of subcarriers from n subcarriers 1 through n and inserting the common control channel signal and the common pilot signal are similar to the third implementation, and descriptions thereof are omitted where they are identical.

Here, the channel structuring of the fourth implementation of the present invention is characterized by the insertion position of the common control channel signal that has the same timing for every subcarrier. However, the insertion position of the common pilot signal is selected at different timing for every subcarrier.

For example, the common control channel signal is inserted into the insertion position SC 1-1 of the subcarrier 1, and the insertion position SC 2-1 of the subcarrier 2. Further, the common pilot signal is inserted into the insertion position SC 1-2 of the subcarrier 1, and the insertion position SC 2-2 of the subcarrier 2.

In addition, arbitrary insertion positions and time length are possible for the relative insertion position and the time length of the common control channel signal and the common pilot signal within a time frame.

Figure 6:
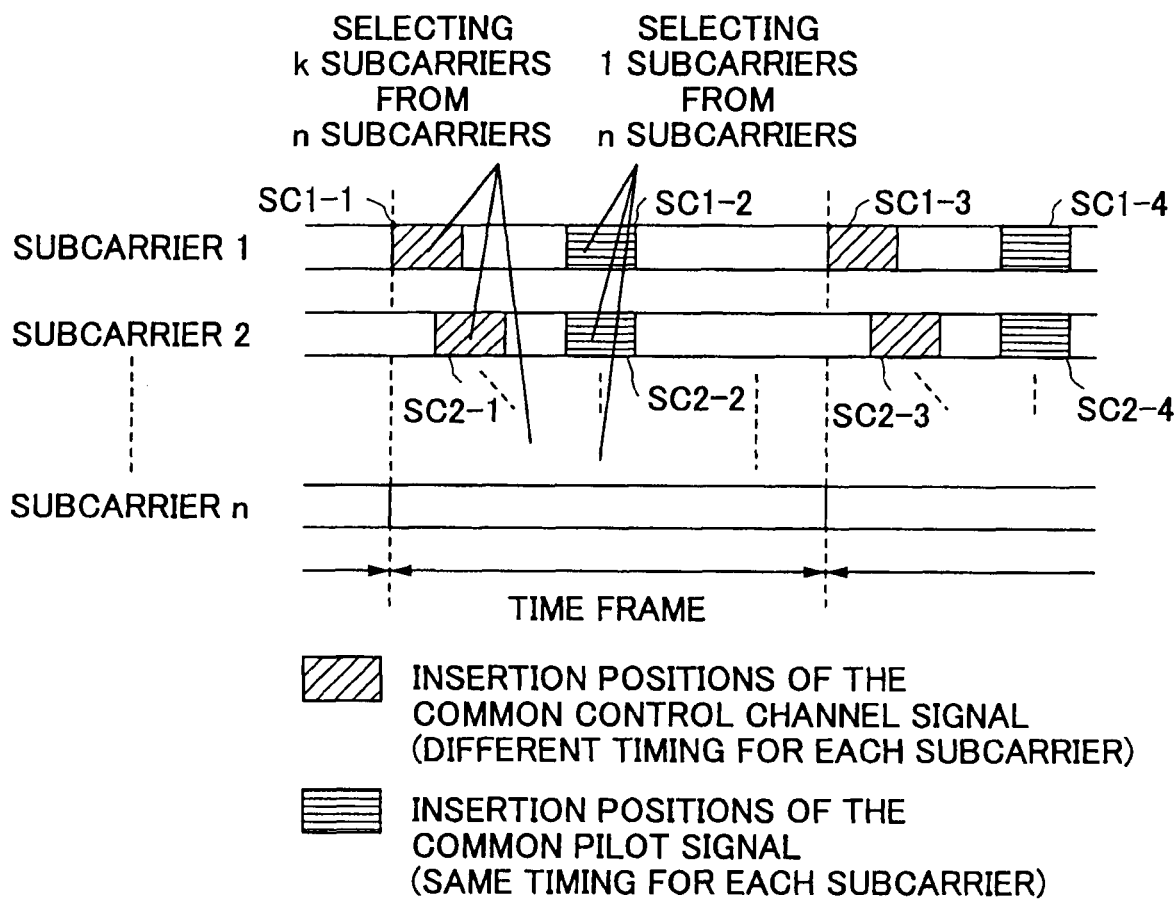
FIG. 6 is a channel structuring drawing of the fifth implementation of the channel structuring method in the present invention.

FIG. 6 shows the channel structuring of the fifth implementation of the channel structuring method in the present invention. In the channel structuring drawing of FIG. 6, providing time frames in the communication channel of the n subcarriers 1 through n, and selecting an arbitrary number of subcarriers from n subcarriers 1 through n and inserting the common control channel signal and the common pilot signal are similar to the third implementation, and descriptions thereof are omitted where they are identical.

Here, the channel structuring of the fifth implementation of the present invention is characterized by the insertion position of the common pilot signal that has the same timing for every subcarrier. However, the insertion position of the common control channel signal is chosen at different timing for every subcarrier.

For example, the common control channel signal is inserted into the insertion position SC 1-1 of the subcarrier 1, and the insertion position SC 2-1 of the subcarrier 2. Further, the common pilot signal is inserted into the insertion position SC 1-2 of the subcarrier 1, and the insertion position SC 2-2 of the subcarrier 2.

In addition, arbitrary insertion positions and time length are possible for the relative insertion position and the time length of the common control channel signal and the common pilot signal within a time frame.

Figure 7:
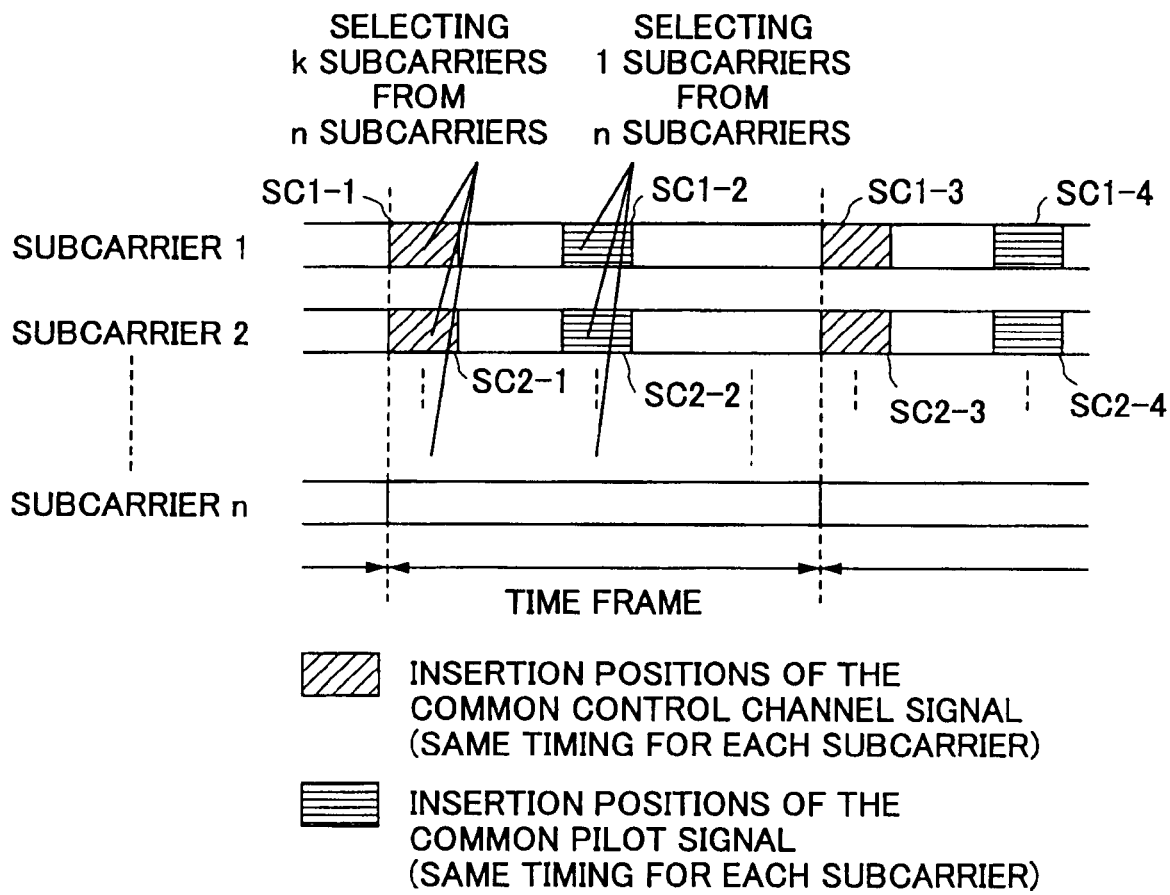
FIG. 7 is a channel structuring drawing of the sixth implementation of the channel structuring method in the present invention.

FIG. 7 shows the channel structuring of the sixth implementation of the channel structuring method in the present invention. In the channel structuring drawing of FIG. 7, providing time frames in the communication channel of the n subcarriers 1 through n, and selecting an arbitrary number of subcarriers from n subcarriers 1 through n and inserting the common control channel signal and the common pilot signal are similar to the third implementation, and descriptions thereof are omitted where they are identical.

Here, the channel structuring of the sixth implementation of the present invention is characterized by the insertion position of the common control channel signal and the common pilot signal that have the same timing for every subcarrier.

For example, the common control channel signal is inserted into the insertion position SC 1-1 of the subcarrier 1, and the insertion position SC 2-1 of the subcarrier 2. Further, the common pilot signal is inserted into the insertion position SC 1-2 of the subcarrier 1, and the insertion position SC 2-2 of the subcarrier 2.

In addition, arbitrary insertion positions and time length are possible for the relative insertion position and the time length of the common control channel signal and the common pilot signal within a time frame.

Figure 8:
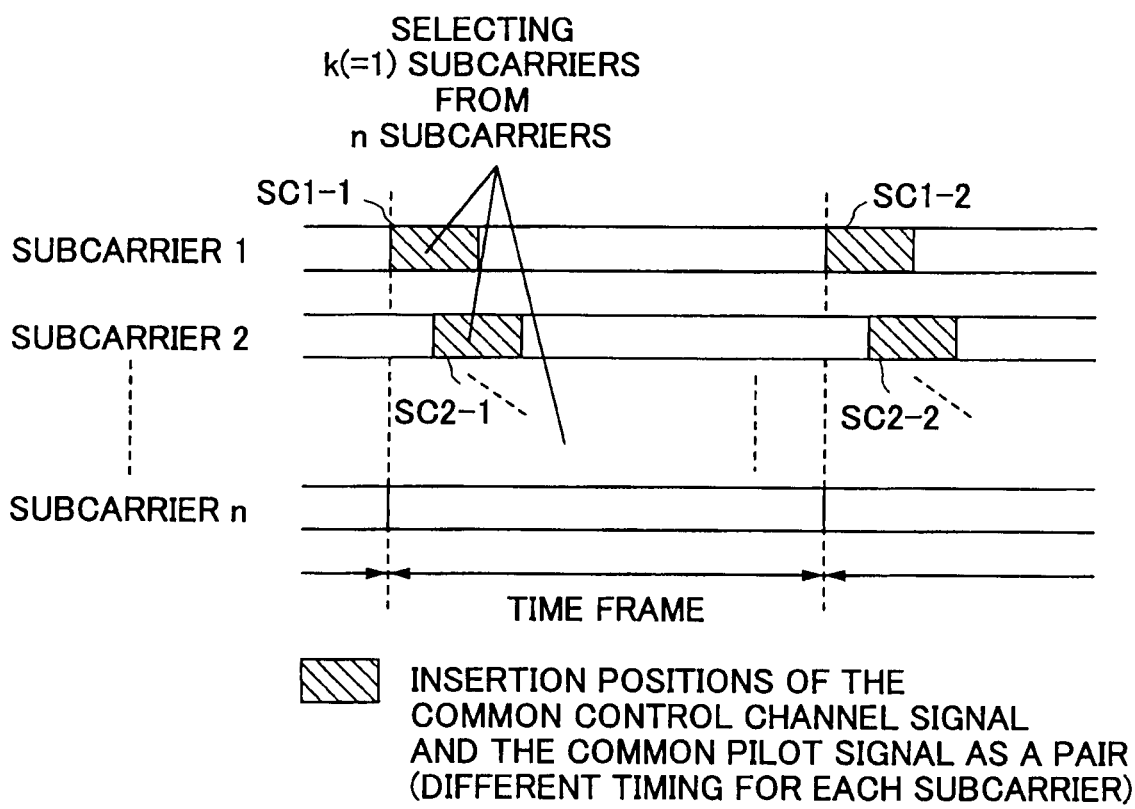
FIG. 8 is a channel structuring drawing of the seventh implementation of the channel structuring method in the present invention.

FIG. 8 shows the channel structuring of the seventh implementation of the channel structuring method in the present invention. In FIG. 8, the time frames segmented at every fixed interval in the communication channel of n subcarriers 1 through n are provided.

First, arbitrary k pieces (k: natural number, k<=n) of the subcarriers are selected from n subcarriers 1 through n, and a pair of the common control channel signal and the common pilot signal is periodically inserted into each of the time frames.

For example, the pair of the common control channel signal and the common pilot signal is inserted into the insertion positions SC 1-1 and SC 1-2 of the subcarrier 1. Further, the insertion position of the pair of the common control channel signal and the common pilot signal is chosen at different timing for every subcarrier, like the insertion position SC 1-1 of the subcarrier 1, and the insertion position SC 2-1 of the subcarrier 2.

In addition, arbitrary insertion positions and time length are possible for the relative insertion position and the time length of the pair of the common control channel signal and the common pilot signal within a time frame.

Figure 9:
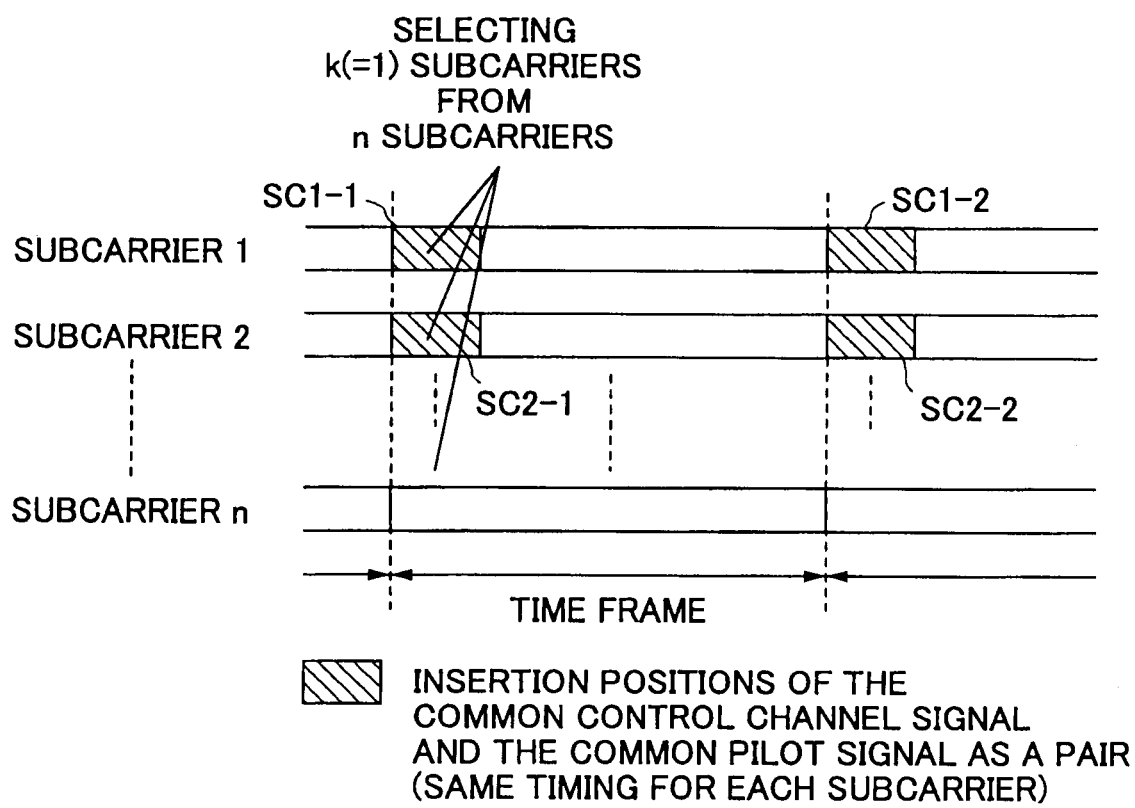
FIG. 9 is a channel structuring drawing of the eighth implementation of the channel structuring method in the present invention.

FIG. 9 shows the channel structuring of the eighth implementation of the channel structuring method in the present invention. In the channel structuring drawing of FIG. 9, providing time frames in the communication channel of the n subcarriers 1 through n, and selecting an arbitrary number of subcarriers from n subcarriers 1 through n and inserting the common control channel signal and the common pilot signal are similar to the third implementation, and descriptions thereof are omitted where they are identical.

Here, the channel structuring of the eighth implementation of the present invention is characterized by the insertion position of the pair of the common control channel signal and the common pilot signal that have the same timing for every subcarrier.

For example, the insertion position of the pair of the common control channel signal and the common pilot signal is chosen at the same timing for every subcarrier like the insertion position SC 1-1 of the subcarrier 1, and the insertion position SC 2-1 of the subcarrier 2.

In addition, arbitrary insertion positions and time length are possible for the relative insertion position and the time length of the pair of the common control channel signal and the common pilot signal within a time frame.

Figure 10:
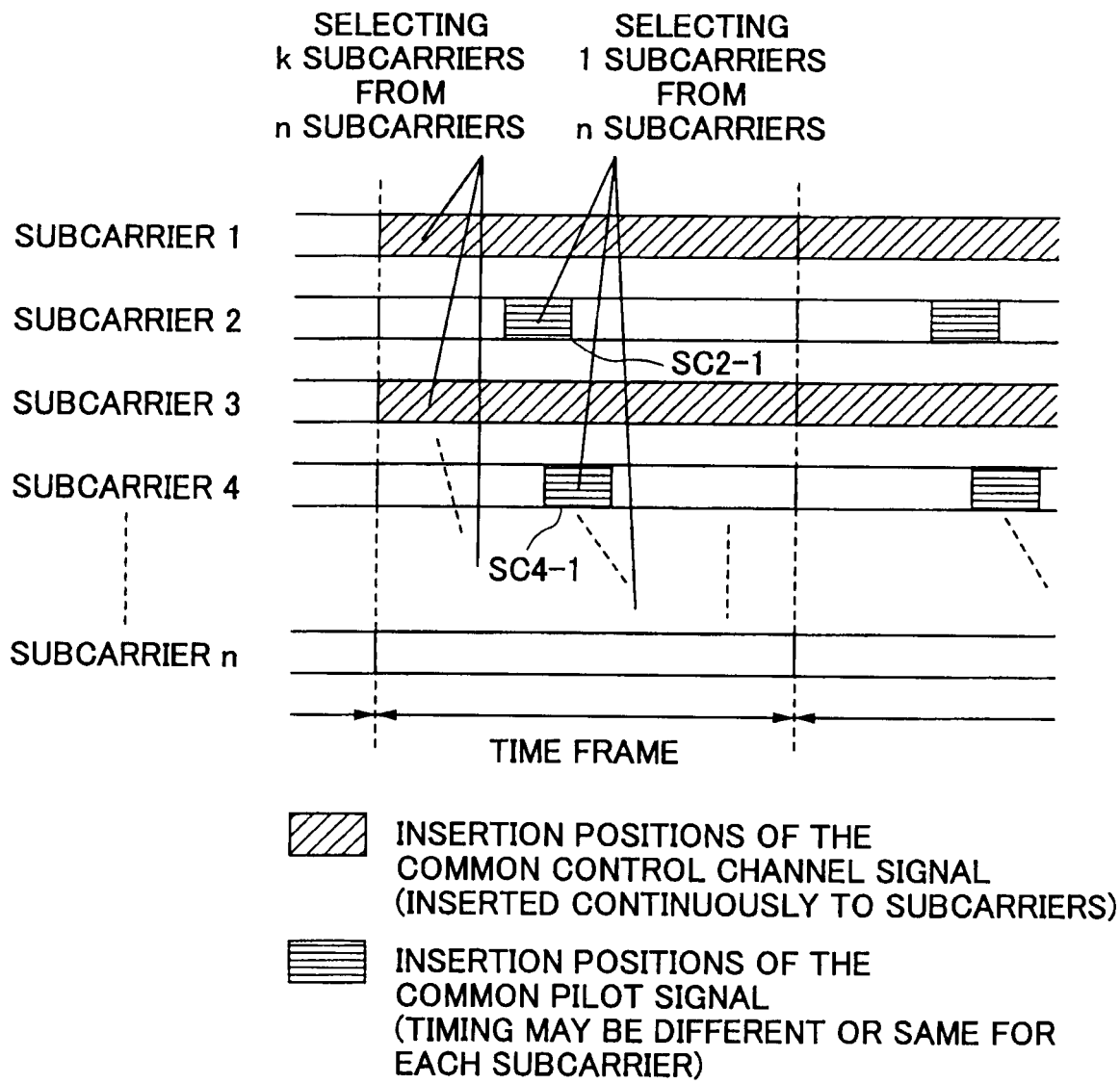
FIG. 10 is a channel structuring drawing of the ninth implementation of the channel structuring method in the present invention.

FIG. 10 shows the channel structuring of the ninth implementation of the channel structuring method in the present invention. In FIG. 10, the time frames which are segmented at every fixed interval in the communication channel of n subcarriers 1 through n are provided.

First, arbitrary k pieces (k: natural number, k<=n) of the subcarriers are selected from n subcarriers 1 through n, and the common control channel signal is continuously inserted into the time frame of the selected subcarriers. For example, the common control channel signal is continuously inserted into the time frame of the selected subcarriers 1 and 3.

Further, arbitrary l piece (l: natural number, l<=n) of the subcarriers are selected from the n subcarriers 1 through n, and the common pilot signal is periodically inserted into every time frame. For example, the common pilot signal is inserted into the insertion positions SC 2-1 and SC 4-1 of the selected subcarriers 2 and 4, respectively. In addition, the insertion position of the common pilot signal may be chosen at different timing, or the same timing for every subcarrier.

Here, the channel structuring of the ninth implementation of the present invention is characterized by the fact that a subcarrier into which the common control channel signal is inserted is different from a subcarrier into which the common pilot signal is inserted. In addition, arbitrary insertion positions and time length are possible for the relative insertion position and the time length of the common pilot signal within a time frame.

Figure 11:
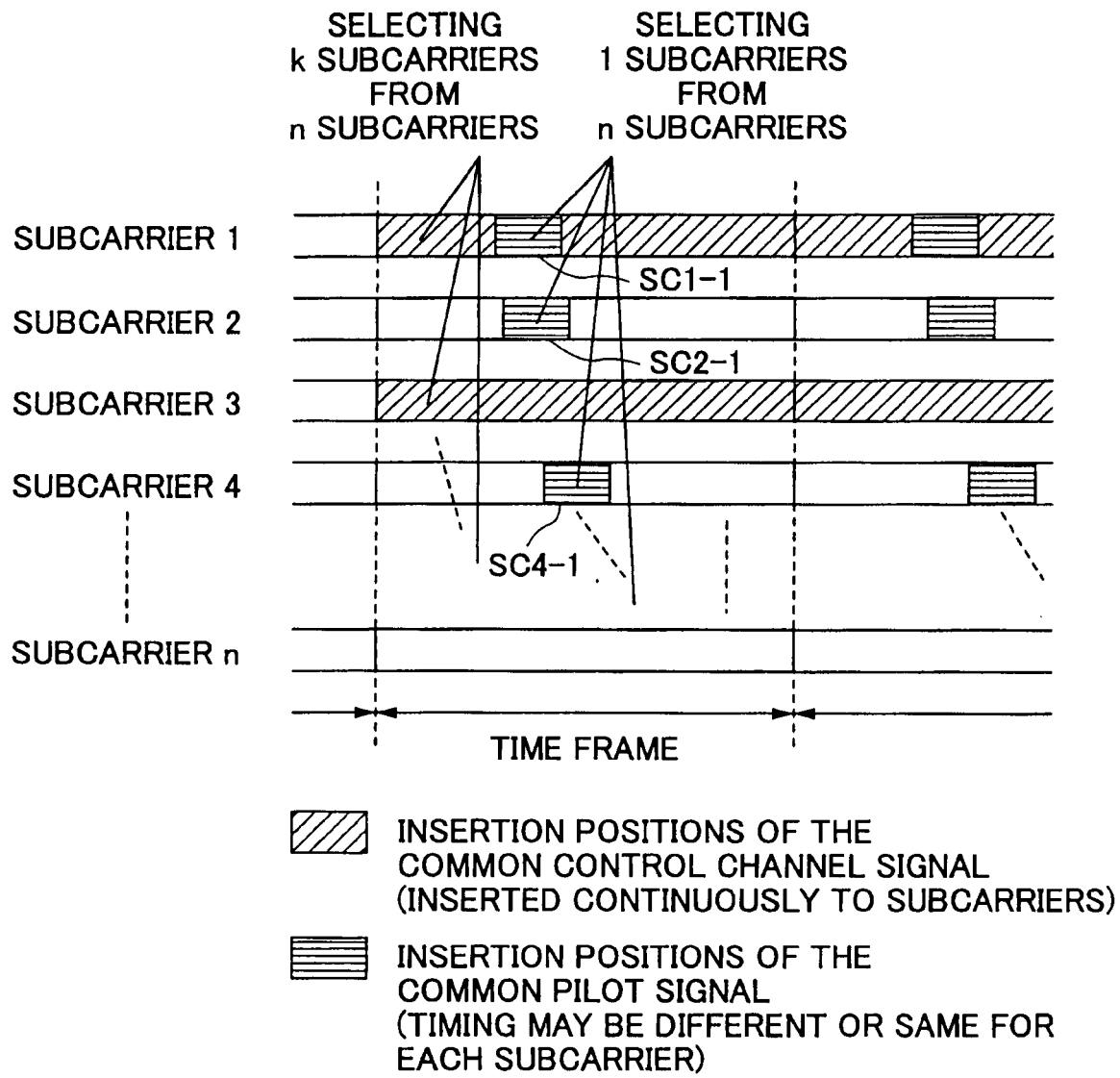
FIG. 11 is a channel structuring drawing of the 10th implementation of the channel structuring method in the present invention.

FIG. 11 shows the channel structuring of the 10th implementation of the channel structuring method in the present invention. Here, providing time frames into the communication channels of the n subcarriers 1 through n and selecting arbitrary subcarriers from the n subcarriers 1 through n, and inserting the common control channel signal and the common pilot signal are the same as in the ninth implementation. And therefore, descriptions are omitted where they are identical.

Here, channel structuring of the 10th implementation of the present invention is characterized by the fact that a subcarrier into which the common control channel signal is inserted and a subcarrier into which the common pilot signal is inserted are partially overlapping.

For example, when the common control channel signal is continuously inserted into the time frames of the subcarrier 1, the insertion position SC 1-1 is assigned for the common pilot signal to be inserted. Consequently, as for the subcarrier 1, the common pilot signal is inserted into the insertion position SC 1-1, and the common control channel signal is continuously inserted into time frames other than the insertion position SC1-1 for the common pilot signal.

In addition, arbitrary insertion positions and time length are possible for the relative insertion position and the time length of the common pilot signal within a time frame.

Figure 12:
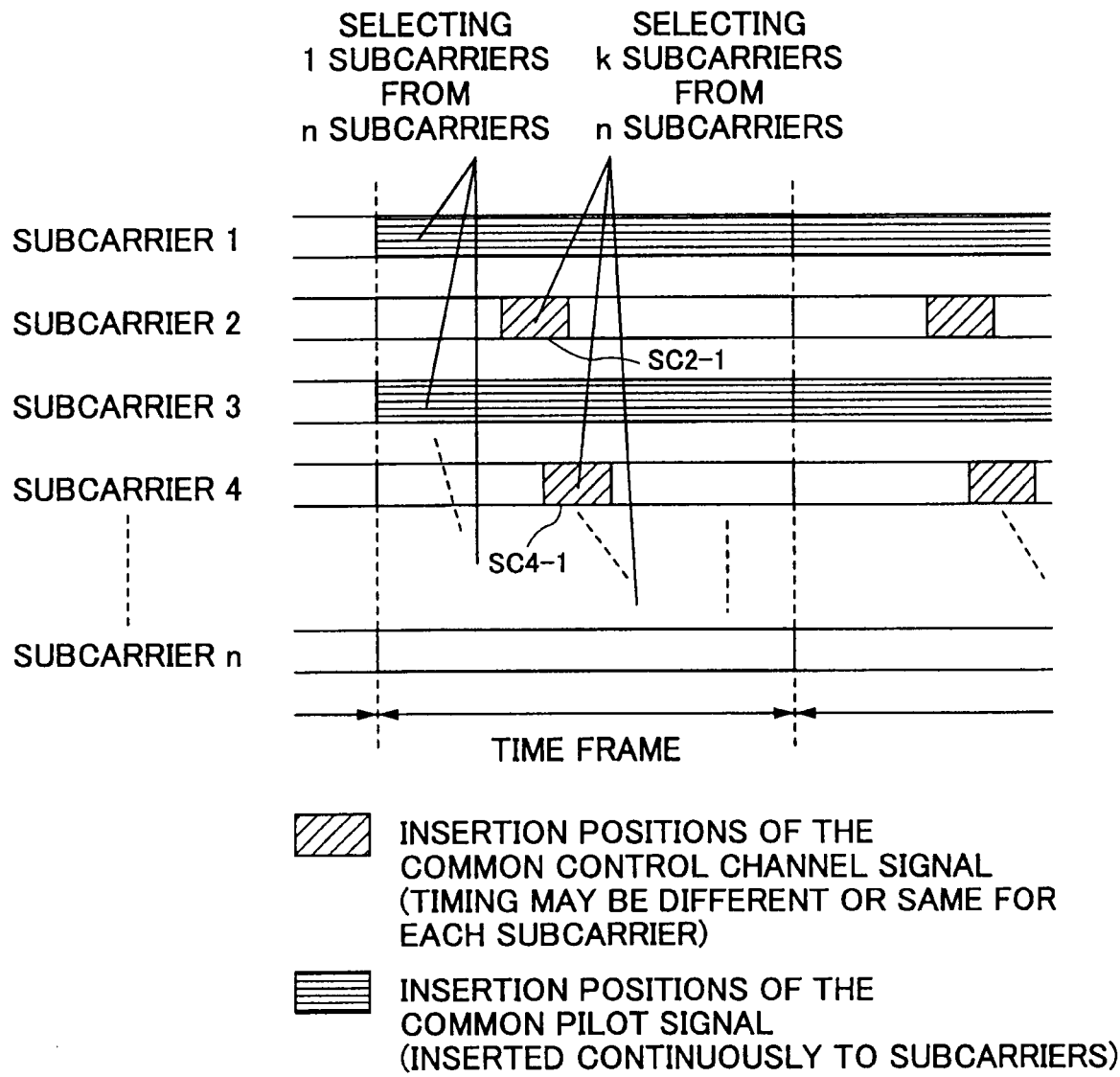
FIG. 12 is a channel structuring drawing of the 11th implementation of the channel structuring method in the present invention.

FIG. 12 shows the channel structuring of the 11th implementation of the channel structuring method in the present invention. In FIG. 12, the time frames segmented at a fixed interval are set up in the communication channel of the n subcarriers 1 through n.

First, k pieces (k: natural number, k<=n) of the arbitrary subcarriers are selected from the n subcarriers 1 through n, and the common control channel signal is periodically inserted into every time frame. For example, the common control channel signal is inserted into the insertion position SC 2-1 and SC 4-1 of the selected subcarriers 2 and 4, respectively. In addition, the insertion position of the common control channel signal is chosen either at a different timing or the same timing for every subcarrier.

Further, l pieces (l: natural number, l<=n) of the arbitrary subcarriers are selected from the n subcarriers 1 through n, and the common pilot signal is continuously inserted into the time frame of the selected subcarriers. For example, the common pilot signal is continuously inserted into the time frame of the selected subcarriers 1 and 3.

Here, channel structuring of the 11th implementation of the present invention is characterized by the fact that a subcarrier into which the common control channel signal is inserted differs from a subcarrier into which the common pilot signal is inserted. In addition, arbitrary insertion positions and time length are possible for the relative insertion position and the time length of the common control channel signal within a time frame.

Figure 13:
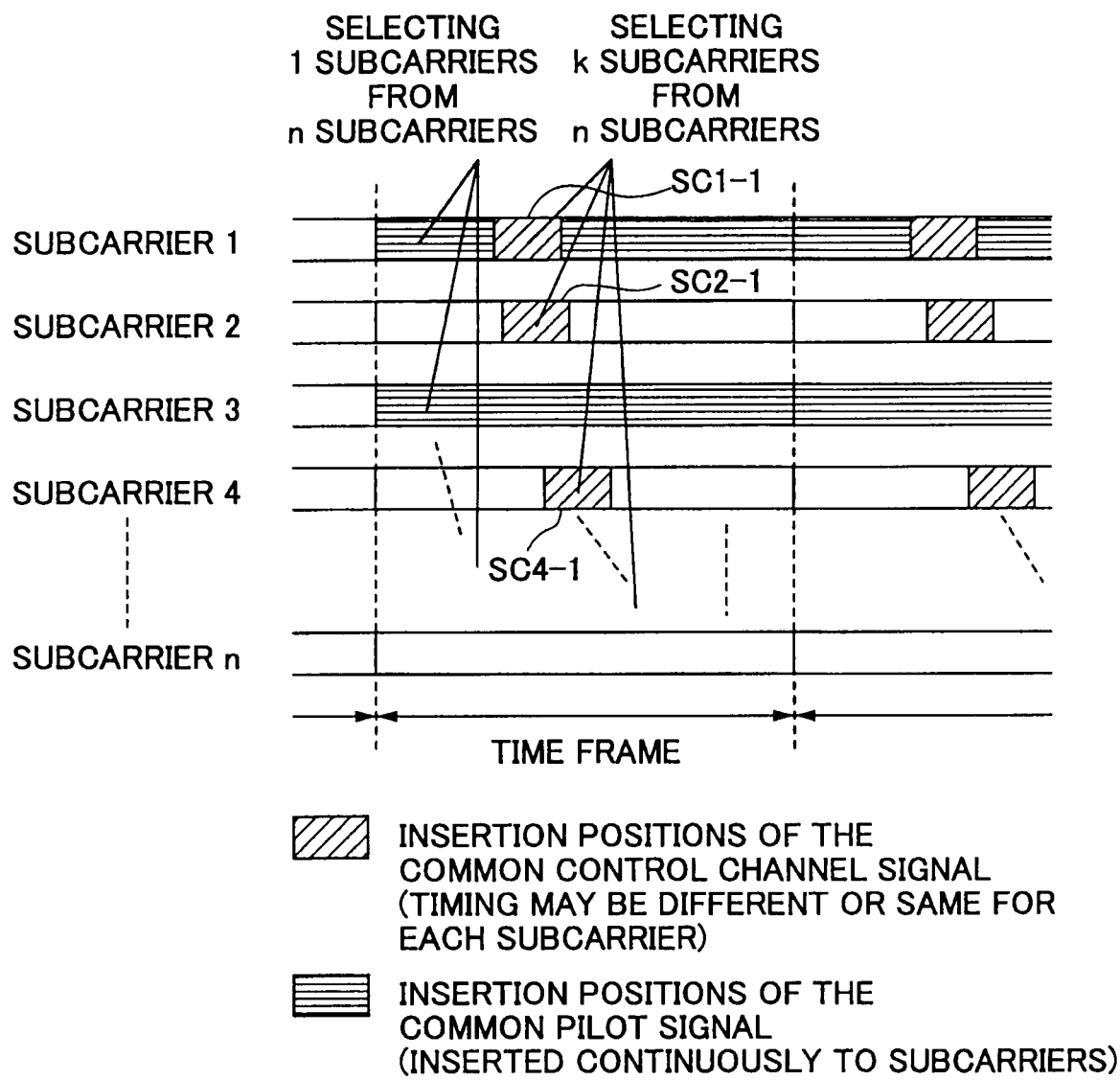
FIG. 13 is a channel structuring drawing of the 12th implementation of the channel structuring method in the present invention.

FIG. 13 shows the channel structuring of the 12th implementation of the channel structuring method in the present invention. In the channel structuring drawing of FIG. 9, providing time frames in the communication channel of the n subcarriers 1 through n, and selecting an arbitrary number of subcarriers from n subcarriers 1 through n and inserting the common control channel signal and the common pilot signal are similar to the third implementation, and descriptions thereof are omitted where they are identical.

Here, channel structuring of the 12th implementation of the present invention is characterized by the fact that a subcarrier into which the common control channel signal is inserted and a subcarrier into which the common pilot signal is inserted are partially overlapping.

For example, when the common pilot signal is continuously inserted into the time frames of the subcarrier 1, the insertion position SC 1-1 is assigned for the common control channel signal to be inserted. Consequently, the common control channel signal is inserted into the insertion position SC 1-1, and the common pilot signal is continuously inserted into the time frames of the subcarrier 1 other than the common control channel signal insertion position SC1-1. In addition, arbitrary insertion positions and time length are possible for the relative insertion position and the time length of the common control channel signal within a time frame.

Figure 14:
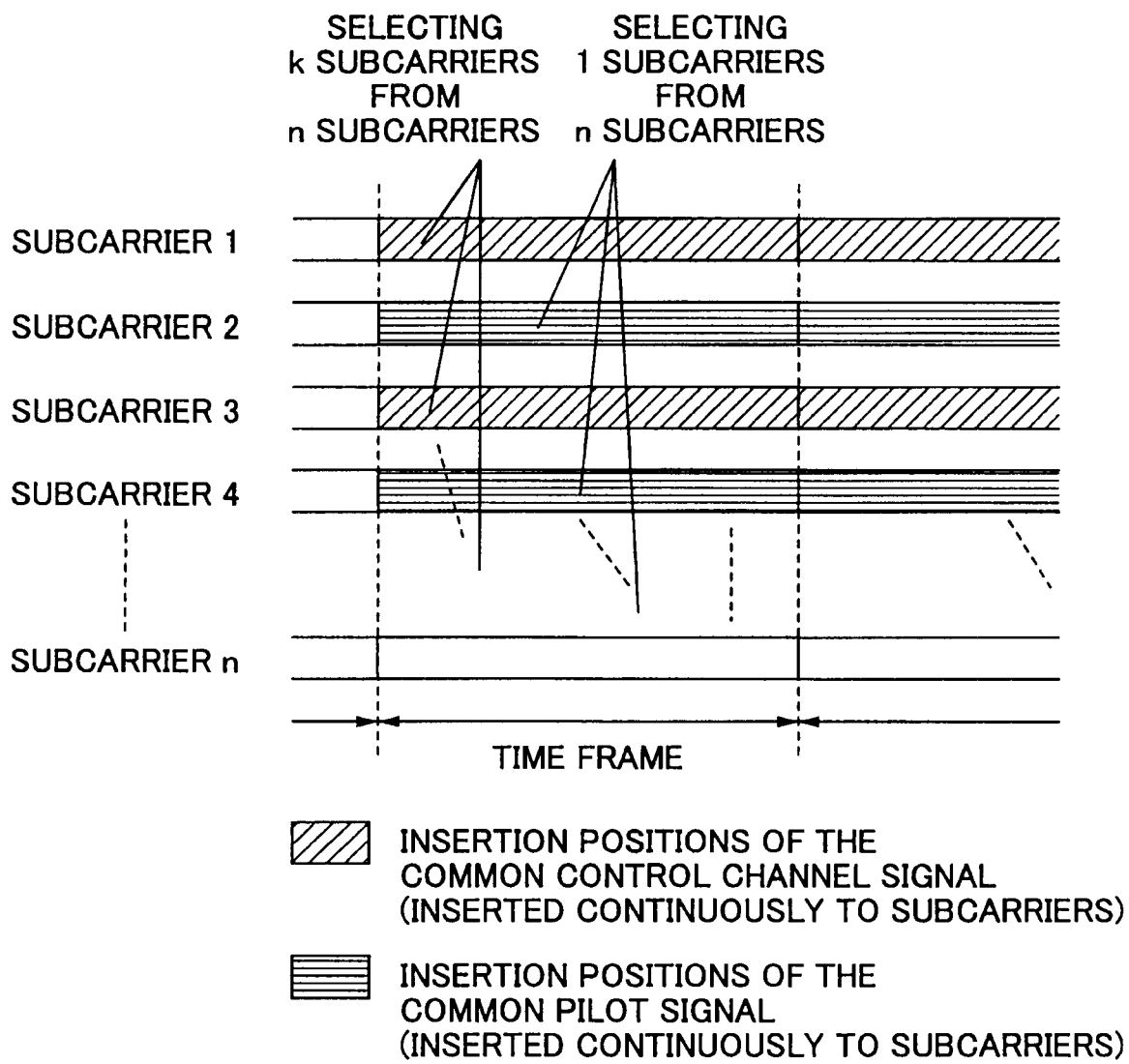
FIG. 14 is a channel structuring drawing of the 13th implementation of the channel structuring method in the present invention.

FIG. 14 shows the channel structuring of the 13th implementation of the channel structuring method in the present invention. In FIG. 14, the time frames segmented at a fixed interval are set up in the communication channel of the n subcarriers 1 through n.

First, k pieces (k: natural number, k<=n) of the arbitrary subcarriers are from the n subcarriers 1 through n, and the common control channel signal is continuously inserted into the time frames of the selected subcarriers. For example, the common control channel signal is continuously inserted into the time frames of the selected subcarriers 1 and 3.

Further, l pieces (l: natural number, l<=n) of the arbitrary subcarriers are selected from the n subcarriers 1 through n, and the common pilot signal is continuously inserted into the time frames of the selected subcarriers. For example, the common pilot signal is continuously inserted into the time frames of the selected subcarriers 2 and 4.

Here, channel structuring of the 13th implementation of the present invention is characterized by the fact that the common control channel signal and the common pilot signal are continuously inserted into the selected subcarriers, respectively.

As mentioned above, the common control channel signal and the common pilot signal can be inserted into the downlink channel between the base station and the mobile stations of the OFDM/TDM transmission method by using the channel structuring in the first through the 13th implementations of the present invention Therefore, the channel structuring method for inserting the common control channel signal and the common pilot signal into the downlink channel between the base station and the mobile stations, and the base station using the channel structuring method can be realized.

As described above, according to the present invention, the common control channel signal and the common pilot signal can be inserted into the downlink channel between the base station and the mobile stations, thereby realizing the transmission of the common control signal.

Therefore, the OFDM/TDM transmission method can be actually applied to a downlink in a mobile communication system.

What is claimed is:

1. A channel structuring method of configuring a downlink channel by modulating a transmission signal by orthogonal frequency division multiplexing method with n subcarriers, the channel structuring method comprising:
   providing time frames by segmenting a communication channel of the n subcarriers at every predetermined interval; and
   selecting a predetermined number of subcarriers from the n subcarriers, and inserting a common control channel signal and a common pilot signal into a time frame of the time frames by time division multiplexing with respect to at least one of the selected subcarriers, such that the common control channel signal is inserted at a timing that is the same for one of the selected subcarriers and another one of the selected subcarriers, while the common pilot signal is inserted at a timing that is different for the one of the selected subcarriers and the another one of the selected subcarriers.

2. A base station that configures a downlink channel by modulating a transmission signal by orthogonal frequency division multiplexing with n subcarriers, the base station comprising:

a unit configured to provide time frames by segmenting a communication channel of the n subcarriers at every predetermined interval; and a unit configured to select a predetermined number of subcarriers from the n subcarriers, and to insert a common control channel signal and a common pilot signal into a time frame of the time frames by time division multiplexing with respect to at least one of the selected subcarriers, such that the common control channel signal is inserted at a timing that is the same for one of the selected subcarriers and another one of the selected subcarriers, while the common pilot signal is inserted at a timing that is different for the one of the selected subcarriers and the another one of the selected subcarriers.

3. A communication system comprising:

a mobile station that receives a downlink channel; and a base station that configures the downlink channel by modulating a transmission signal by orthogonal frequency division multiplexing with n subcarriers, the base station comprising:

a unit configured to provide time frames by segmenting a communication channel of the n subcarriers at every predetermined interval; and a unit configured to select a predetermined number of subcarriers from the n subcarriers, and to insert a common control channel signal and a common pilot signal into a time frame of the time frames by time division multiplexing with respect to at least one of the selected subcarriers, such that the common control channel signal is inserted at a timing that is the same for one of the selected subcarriers and another one of the selected subcarriers, while the common pilot signal is inserted at a timing that is different for the one of the selected subcarriers and the another one of the selected subcarriers.

* * * * *